T. LOVE.
STEERING DEVICE FOR TRACTION ENGINES.
APPLICATION FILED FEB. 19, 1913.
1,097,723.
Patented May 26, 1914.
2 SHEETS—SHEET 1.
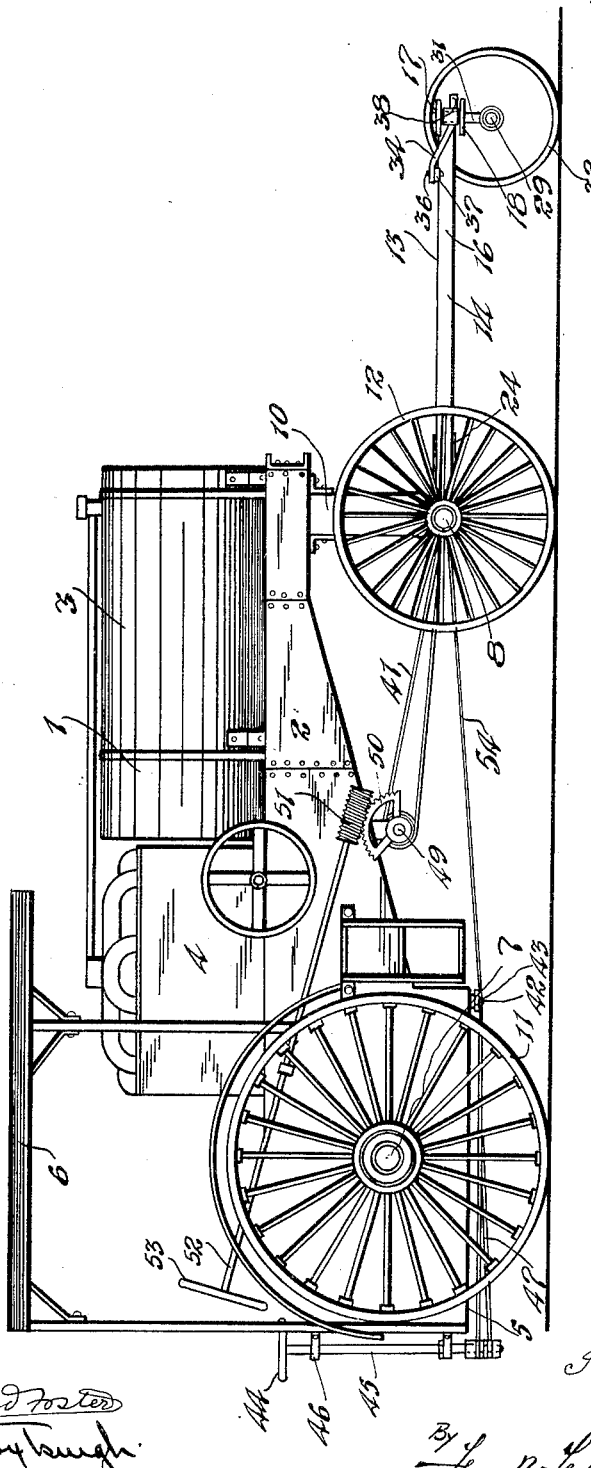

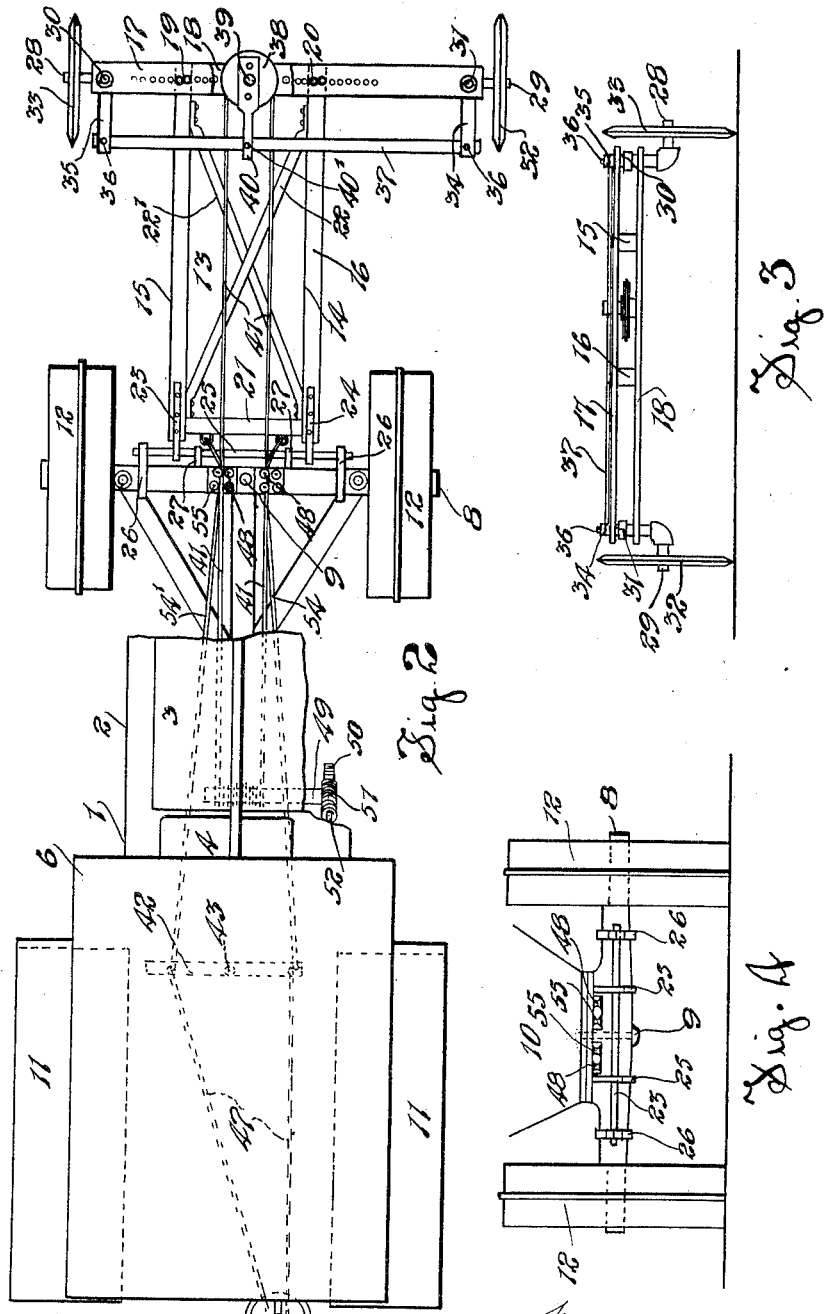

UNITED STATES PATENT OFFICE.

THOMAS LOVE, OF HARTNEY, MANITOBA, CANADA.

STEERING DEVICE FOR TRACTION-ENGINES.

1,097,723.     Specification of Letters Patent.     Patented May 26, 1914.

Application filed February 19, 1913. Serial No. 749,374.

*To all whom it may concern:*

Be it known that I, THOMAS LOVE, of the village of Hartney, in the Province of Manitoba, Canada, have invented certain new and useful Improvements in Steering Devices for Traction-Engines, of which the following is the specification.

The invention relates to a steering device attachable to a traction engine and adapted to guide the traction engine particularly when the same is being used for dragging plows and the object of the invention is to provide a comparatively inexpensive, durable and efficient steering device which can be quickly attached to a traction engine and which can be controlled when attached from the platform of said engine.

A further object of the invention is to provide a steering attachment which can be adjusted in respect to the front axle of the traction engine.

With the above objects in view the invention consists essentially in a frame, means securing the rear end of the frame adjustably to the traction engine on which it is applied, pivoted guide wheels supporting the forward end of the frame, means for adjusting the position of the guide wheels in respect to the frame and means for steering the guide wheels, the parts being arranged and constructed as hereinafter more particularly described.

Figure 1 represents a side view of my device applied on a traction engine. Fig. 2 represents a plan view of the same, part of the traction engine being removed to expose construction. Fig. 3 represents a front view of the steering device. Fig. 4 represents a front view of the front axle of the traction engine and adjoining parts.

In the drawings like characters of reference indicate corresponding parts in each figure.

1 represents a traction engine of which 2 is the frame, 3 the boiler, 4 the engine, 5 the back platform, 6 the canopy, 7 the rear axle and 8 the front axle, the rear axle being permanently secured to the frame while the front axle is pivotally fastened by the usual king bolt 9 to the bolster 10.

11 are the rear traction wheels and 12 the forward carriage wheels.

The above parts are as ordinarily constructed and their description is not herein entered into in detail as it is considered their construction and operation is well understood to those conversant with such machines.

13 represents my steering device which is now described in detail.

14 represents a frame formed from side members 15 and 16 having their forward ends inserted between an opposing pair of forward cross cars 17 and 18 to which they are adjustably fastened by bolts 19 and 20 and their rear ends spaced apart by and connected to a cross beam 21.

22 and 22′ represent angularly disposed braces secured to the frame and strengthening the same.

The rear end of the frame is provided with extending bearings 23 and 24 slidably mounted on a cross rod 25 permanently supported in pairs of brackets 26 and 27 securely fastened to the front axle 8 of the traction engine.

28 and 29 represent stub axles extending from vertically disposed spindles 30 and 31 pivotally mounted in the ends of the cross bars 17 and 18.

32 and 33 are guide wheels rotatably mounted on the stub axles.

34 and 35 are arms permanently secured to the spindles and extending rearwardly therefrom. The arms are fastened pivotally by pins 36 to a common connecting bar 37.

38 is a pulley located between the bars 17 and 18 and mounted rotatably on an upright pin 39. An arm 40 is fastened to the pulley and extends rearwardly to the connecting bar to which it is fastened by a pivot pin 40′.

41 is a cable rope or such like passing around and secured to the pulley 38 and extending rearwardly, the ends of the cable being connected to and wound around a cross shaft 49 suitably mounted in brackets located on the under side of the frame. The shaft is fitted at the outer end with a worm wheel 50 engageable with a worm 51 carried at the end of a rod 52 supplied with a hand wheel 53.

44 is a hand wheel located at the upper end of a post 45 carried by brackets 46 carried by the traction engine. A cable 47 is wound around the lower end of the post and has the ends thereof passing to the opposite sides of an adjusting bar 42 pivotally secured at 43 to the under side of the platform 5.

The cable 41 extends over the axle, which it will be noticed is provided with sets of pulleys 48 between which said cable passes on opposite sides of the king bolt. It is desirable to have the pulleys located fairly close to the king bolt so that there will be little slackening or tightening of the cable when the steering device is turned.

I have shown the hand wheel 44, post 45 and cable 47 simply as a means for swinging the adjusting bar 42 but do not wish to be limited to this precise construction as anyone could readily suggest many similar devices for accomplishing the same purpose to equal advantage.

54 and 54' are cables having their rear ends secured to the opposite ends of the bar 42 and their forward ends connected to the beam 21. The ends of the cables pass over pulleys 55 mounted on the axle 8 and arranged so that when the bar 42 is turned one of them pulls and the other releases so that the steering device is moved laterally on the rod 25 and in respect to the front axle.

It will be understood of course that the bar 42 is manipulated by turning the hand wheel 44.

The steering of the engine is effected by turning the hand wheel 53 which it will be seen operates through the cable 41 to turn the pulley 38 with the result that the arm 40 is swung to the side and shifts the connecting bar 37 connected with the stub axles 28 and 29. I wish to call particular attention to the lateral adjustment which I provide for in the steering device. This is very important as it is necessary when plowing with a traction engine to adjust the guide wheels in respect to the traction engine and this cannot be done in any of the steering devices of which I am aware without undoing bolts or other such fastenings.

What I claim as my invention is:

1. In a steering device for traction engines, the combination with the front axle of the traction engine, of a frame in advance of the traction engine and carried rearwardly, by the axle, cross bars secured to the frame forwardly, vertically disposed spindles rotatably mounted in the ends of the cross bars, said spindles carrying extending horizontally disposed axles, guide wheels mounted on the axles, arms permanently secured to and extending rearwardly from the spindles, a connecting bar pivotally secured to the rear ends of the arms, a rotatable pulley carried by the cross bar, an arm secured to the pulley and connected pivotally to the connecting bar, a cable wound around and fastened to the pulley and having the ends thereof extending rearwardly to the traction engine and means carried by the traction engine and connected to the ends of the cable for adjusting the same to turn the pulley, as and for the purpose specified.

2. In a steering device for traction engines the combination with the front axle of the traction engine, of a frame in advance of the traction engine and carried rearwardly by the axle, cross bars secured to the frame forwardly, vertically disposed spindles rotatably mounted in the ends of the cross bars, said spindles carrying extending horizontally disposed axles, guide wheels mounted on the axles, arms permanently secured to and extending rearwardly from the spindles, a connecting bar pivotally secured to the rear ends of the arms, a rotatable pulley carried by the cross bar, an arm secured to the pulley and connected pivotally with the connecting bar, a rotatably mounted cross shaft carried by the traction engine, means for adjusting the shaft and a cable wound around and secured to the pulley and having the ends thereof fastened to and wound around the shaft, said cable being guided over suitably located rollers carried by the axle, as and for the purpose specified.

3. The combination with a traction engine, of a cross rod carried by the front axle of the traction engine, a steering device having the rear end thereof slidably mounted on the rod and the means for shifting and retaining the rear end of the steering device in any shifted position, as and for the purpose specified.

4. The combination with a traction engine, of a cross rod carried by the front axle of the traction engine, a steering device in advance of the traction engine having the rear end thereof slidably mounted on the rod, an adjusting bar pivotally secured to the traction engine means for adjusting the bar and cables secured rearwardly to the opposite ends of the bar and forwardly to the steering device, said cables passing over suitable pulleys mounted on the front axle, as and for the purpose specified.

Signed at Hartney this 16th day of January 1913.

THOMAS LOVE.

In the presence of—
  D. W. STOREY,
  H. PERRIN.

Copies of this patent may be obtained for five cents each, by addressing the "Commissioner of Patents, Washington, D. C."